(12) United States Patent
Takagi

(10) Patent No.: US 12,341,374 B2
(45) Date of Patent: Jun. 24, 2025

(54) POWER CONVERSION SYSTEM

(71) Applicant: Mitsubishi Electric Corporation, Tokyo (JP)

(72) Inventor: Toshikazu Takagi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 781 days.

(21) Appl. No.: 17/599,841

(22) PCT Filed: Jun. 20, 2019

(86) PCT No.: PCT/JP2019/024494
§ 371 (c)(1),
(2) Date: Sep. 29, 2021

(87) PCT Pub. No.: WO2020/255330
PCT Pub. Date: Dec. 24, 2020

(65) Prior Publication Data
US 2022/0173658 A1    Jun. 2, 2022

(51) Int. Cl.
*H02J 7/34*    (2006.01)
*H02M 3/00*    (2006.01)
*H02M 3/158*   (2006.01)

(52) U.S. Cl.
CPC ............ *H02J 7/342* (2020.01); *H02M 3/00* (2013.01); *H02M 3/158* (2013.01); *H02J 2207/20* (2020.01)

(58) Field of Classification Search
CPC .................................................. H02J 2207/10
See application file for complete search history.

(56) References Cited

U.S. PATENT DOCUMENTS

| | | | |
|---|---|---|---|
| 7,183,748 B1* | 2/2007 | Unno | H02J 7/04 320/136 |
| 9,537,407 B2* | 1/2017 | Fang | H05B 45/385 |
| 2005/0242787 A1* | 11/2005 | Shirokoshi | H02M 3/1588 323/222 |
| 2009/0173554 A1* | 7/2009 | Yoshioka | E02F 3/325 318/434 |
| 2009/0189579 A1* | 7/2009 | Melanson | H02M 3/33592 323/282 |

(Continued)

FOREIGN PATENT DOCUMENTS

| | | |
|---|---|---|
| JP | 2008-195110 A | 8/2008 |
| JP | 2015-119553 A | 6/2015 |

OTHER PUBLICATIONS

International Search Report for PCT/JP2019/024494 dated Aug. 20, 2019 (PCT/ISA/210).

*Primary Examiner* — Tynese V McDaniel
(74) *Attorney, Agent, or Firm* — Sughrue Mion, PLLC

(57) ABSTRACT

A DC/DC converter includes a power conversion unit for converting input voltage to required voltage, a first control unit for driving the power conversion unit, a power supply device which supplies power to the first control unit and uses an output of the DC/DC converter or a battery as a power supply source, and a power supply function for controlling supply of power to the power supply device. The power supply function is controlled with respect to supply of power, by a second control unit of a power conversion device during a standby state of the DC/DC converter.

17 Claims, 4 Drawing Sheets

(56) References Cited

U.S. PATENT DOCUMENTS

| | | | | |
|---|---|---|---|---|
| 2010/0001695 A1* | 1/2010 | Arai | ............... | H02J 9/005 |
| | | | | 320/162 |
| 2013/0127400 A1* | 5/2013 | Oh | ............... | B60L 58/20 |
| | | | | 320/104 |
| 2013/0163288 A1* | 6/2013 | Kim | ............... | H02M 3/33546 |
| | | | | 363/17 |
| 2014/0177301 A1* | 6/2014 | Kim | ............... | H02M 7/23 |
| | | | | 363/84 |
| 2014/0184191 A1* | 7/2014 | Huang | ............... | H02M 5/293 |
| | | | | 323/351 |
| 2015/0280459 A1* | 10/2015 | Yagi | ............... | H02J 9/005 |
| | | | | 320/107 |
| 2016/0099637 A1* | 4/2016 | Hsiao | ............... | H02M 3/33576 |
| | | | | 363/78 |
| 2016/0308452 A1* | 10/2016 | Motoki | ............... | H02J 7/02 |
| 2016/0352232 A1* | 12/2016 | Chang | ............... | H02M 3/33523 |
| 2018/0231998 A1* | 8/2018 | Im | ............... | H02M 3/16 |
| 2019/0006945 A1* | 1/2019 | Takada | ............... | H02M 1/32 |
| 2019/0036332 A1* | 1/2019 | Kobayashi | ............... | H02J 7/0068 |
| 2019/0312512 A1* | 10/2019 | Takada | ............... | H02M 1/36 |
| 2019/0379290 A1* | 12/2019 | Takada | ............... | G06F 1/3234 |
| 2020/0274439 A1* | 8/2020 | Yang | ............... | H02M 1/36 |
| 2021/0167610 A1* | 6/2021 | Yoon | ............... | H02J 7/007182 |
| 2022/0153213 A1* | 5/2022 | Tanaka | ............... | B60L 9/18 |
| 2022/0216782 A1* | 7/2022 | Takada | ............... | H02M 1/327 |
| 2022/0219547 A1* | 7/2022 | Wang | ............... | H02M 3/1582 |
| 2023/0017285 A1* | 1/2023 | Shinoda | ............... | H02M 3/157 |
| 2023/0036795 A1* | 2/2023 | Kominato | ............... | H02J 7/0068 |
| 2023/0099799 A1* | 3/2023 | Chang | ............... | H02J 7/0013 |
| | | | | 429/90 |
| 2024/0030735 A1* | 1/2024 | Lee | ............... | H02J 7/0063 |

\* cited by examiner

POWER CONVERSION SYSTEM

CROSS REFERENCE TO RELATED APPLICATIONS

This application is a National Stage of International Application No. PCT/JP2019/024494 filed Jun. 20, 2019.

TECHNICAL FIELD

The present disclosure relates to a power conversion system.

BACKGROUND ART

Conventionally, in a power conversion device with a vehicle charger, an AC/DC converter, a DC/DC converter, an inverter, and the like provided in one housing, in order to drive their electric components, power is acquired mainly from a lead battery (hereinafter, referred to as low-voltage battery) mounted on a vehicle, internal power is generated as a power supply source, and the internal power is supplied to various functions.

In particular, from the standpoint of improvement of product property of power components, it is required to improve efficiency of an auxiliary power supply for driving a power converter itself in addition to power conversion efficiency, and further, to reduce standby power. For example, when a DC/DC converter for performing power conversion from high-voltage battery mounted on a vehicle such as a lithium ion battery to a low-voltage battery is driven at a light load, efficiency (loss) of the auxiliary power supply cannot be neglected in view of loss proportion among all the power components. In addition, in order to inhibit battery dead or the like, it is required to lower standby power in an auxiliary power supply system.

Patent Document 1 discloses providing a current supply circuit that enables reduction in dark current or power consumption. That is, the current supply circuit includes a power feeding circuit for supplying current whose magnitude is the same as reference current generated on the basis of power supply voltage, to other circuits, power supply variation predicting means for predicting variation in the power supply voltage on the basis of the state of a load, and reference current changing means for changing the magnitude of the reference current when variation in the power supply voltage is predicted. Then, only when variation in the power supply voltage of a power supply unit is predicted by the power supply variation predicting means, the reference current changing means makes the reference current greater than its normal value. Thus, it is able to provide the current supply circuit that enables reduction in dark current or power consumption.

Patent Document 2 discloses an auxiliary unit power supply device that can eliminate the need of an auxiliary unit battery for supplying standby power to an auxiliary unit. That is, the auxiliary unit power supply device includes a power converter which converts power from a main power supply and outputs the converted power to the auxiliary unit, and a control device which determines whether the auxiliary unit is in a normal operation state or a standby state in accordance with an operating state or a stopping state of a system, and controls the power converter such that, when the auxiliary unit is in a standby state, power from the main power supply is converted to standby voltage, and when the auxiliary unit is in a normal operation state, power from the main power supply is converted to normal operation voltage. Thus, it is possible to supply power to the auxiliary unit without using an auxiliary unit battery. Here, it is disclosed that, preferably, the normal operation voltage is set to be greater than the standby voltage.

As described above, not only in a normal operation state but also in a standby state, power from the main power supply is converted by the power converter and the converted power is supplied to the auxiliary unit, and thus an auxiliary unit battery is not required. Further, it is disclosed that power consumption is effectively reduced by optimal control of the auxiliary unit voltage supplied in the auxiliary unit state.

CITATION LIST

Patent Document

Patent Document 1: Japanese Laid-Open Patent Publication No. 2008-195110
Patent Document 2: Japanese Laid-Open Patent Publication No. 2015-119553

SUMMARY OF THE INVENTION

Problems to be Solved by the Invention

In a conventional power conversion device in which a plurality of components such as an inverter and a converter are integrated in the field of power electronics, in particular, in a DC/DC converter, it is preferable that an auxiliary power supply circuit is configured by using a low-voltage battery line as a supply source, in order to reduce product cost and size and in order to reduce loss. However, there is an issue with standby power.

in order to save standby power, in Patent Document 1, an ignition switch is provided between a power supply unit and the current supply circuit, and a method of interrupting standby power by opening and closing of the ignition switch when operation of the circuit is stopped, is generally used. In this case, there is a problem that the standby power cannot be effectively reduced.

In Patent Document 2, the power converter is controlled in accordance with an operating state or a standby state of the auxiliary unit, and the value of power supply voltage to be supplied to the auxiliary unit is adjusted, whereby standby power is suppressed. However, in a case of attempting to apply such a method to a DC/DC converter which performs power conversion from a high-voltage battery to a low-voltage battery, the amount of energy taken out from the high-voltage battery in a standby state cannot be neglected. In particular, when power for driving a power conversion unit is directly supplied from a DC/DC converter output line, the main circuit needs to continue operating constantly. In order to reduce standby power of the corresponding converter, it is best in view of total energy cost in the power conversion device that, during a standby state, power conversion operation of the main circuit is stopped and standby power of a power supply circuit unit for driving the corresponding components is also reduced.

The present disclosure has been made to solve the above problems, and an object of the present disclosure is to suppress standby power in a power supply device or a control unit of a DC/DC converter by controlling whether to supply power or stop the supply of power by using a power supply function during an operation stopping state of the DC/DC converter.

Means of Solution to the Problems

A power conversion system according to the present disclosure includes a DC/DC converter for charging a battery, and a power conversion device composed of at least one of an inverter or a converter. The DC/DC converter includes a power conversion unit for converting input voltage to required voltage, a first control unit for driving the power conversion unit, a power supply device which supplies power to the first control unit and uses an output of the DC/DC converter or the battery as a power supply source, and a power supply function for controlling supply of power to the power supply device. The power supply function is controlled with respect to supply of power, by a second control unit of the power conversion device, during a standby state of the DC/DC converter.

Another power conversion system according to the present disclosure includes a DC/DC converter for charging a battery, and a power conversion device composed of at least one of an inverter or a converter. The DC/DC converter includes a power conversion unit for converting input voltage to required voltage, a first control unit for driving the power conversion unit, and a power supply device which supplies power to the first control unit and uses an output of the DC/DC converter or the battery as a power supply source. The power supply device is provided with a power supply device output ON/OFF function for issuing commands for output permission and output stoppage. The power supply device output ON/OFF function is controlled with respect to supply of power, by a second control unit of the power conversion device, during a standby state of the DC/DC converter.

Effect of the Invention

In the power conversion system according to the present disclosure, during an operation stop state of the DC/DC converter, supply of power from the other power conversion device is controlled and thus supply of power is controlled by the power supply function. Whereby, standby power in the power supply device or the control unit of the DC/DC converter connected to the battery can be reduced.

EMBODIMENTS FOR CARRYING OUT THE INVENTION

Embodiment 1

The present embodiment relates to, for example, a system for reducing standby power of a control power supply circuit in a power conversion device in which a plurality of components such as an inverter and a converter are integrally formed in the field of power electronics.

Figure 1:
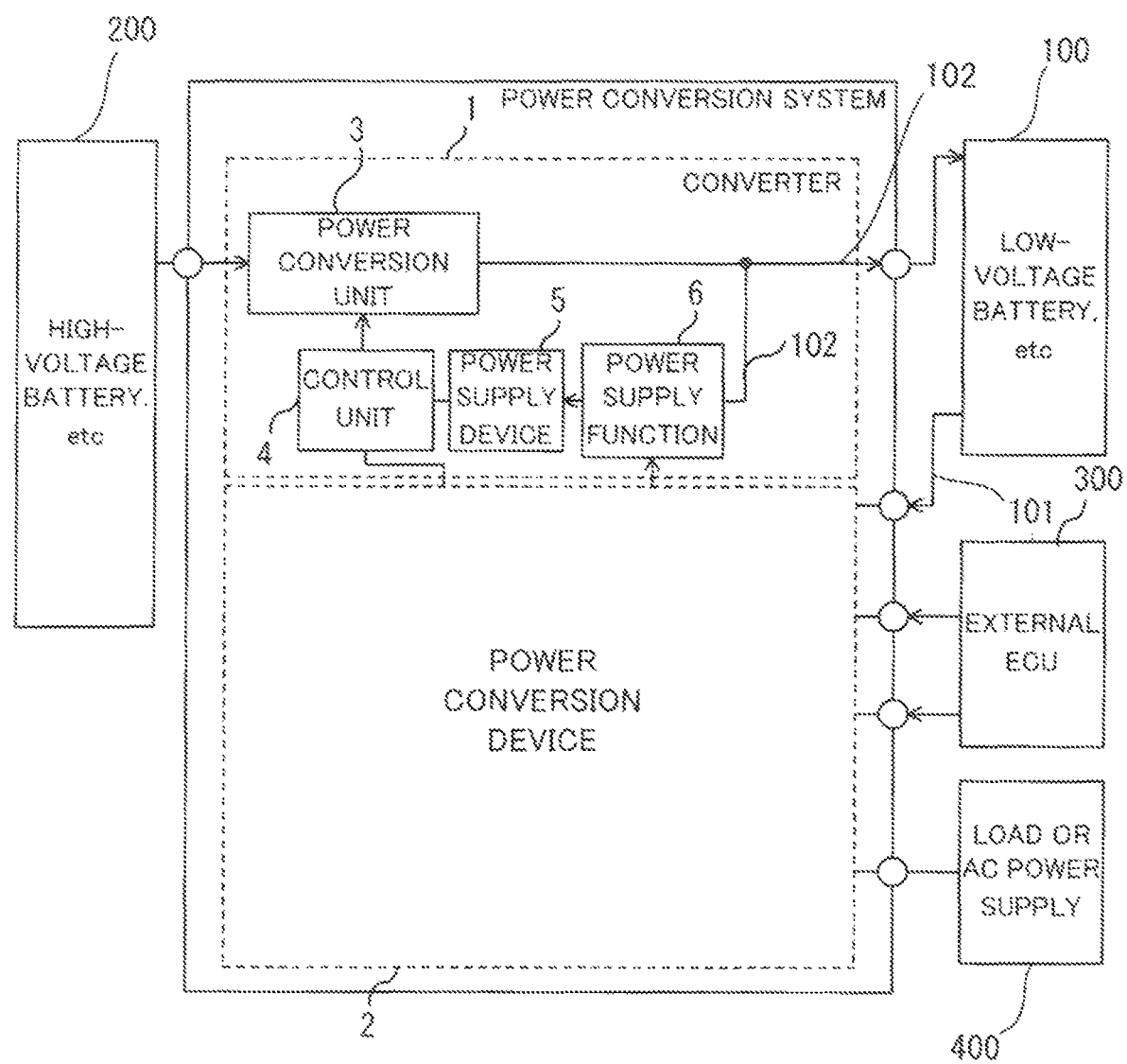
FIG. 1 is a block diagram showing the basic configuration of a power conversion system according to embodiment 1.

FIG. 1 is a block diagram showing the basic configuration of a power conversion system according to the present embodiment. The power conversion system includes a DC/DC converter 1 for charging a low-voltage battery 100, and another power conversion device 2 composed of a plurality of inverters or converters. That is, the power conversion device 2 is composed of at least one of an inverter or a converter. The DC/DC converter 1 includes a power conversion unit 3, a control unit (first control unit) 4, and a power supply device 5. The power conversion unit 3 converts input voltage to desired voltage. The control unit 4 drives the power conversion unit 3. The power supply device 5 supplies power to the control unit 4. A power supply source for the power supply device 5 is an output of the DC/DC converter 1 itself or the low-voltage battery 100, and a power supply function 6 is provided in order to control the supply of power or the stop of the supply of power.

The DC/DC converter 1 for charging the low-voltage battery 100, and the power conversion device 2 composed of a plurality of inverters or converters and the like, are stored in one housing, and their respective components are controlled on the basis of a command or an operation from the outside.

An object of the present embodiment is to, during an operation stopping state of the DC/DC converter 1, control power supply by the other power conversion device 2 so as to control the supply of power or the stop of the supply of power, thereby to reduce standby power in an auxiliary unit such as the power supply device 5 or the control unit 4 of the DC/DC converter 1 connected to the low-voltage battery 100.

Figure 2:
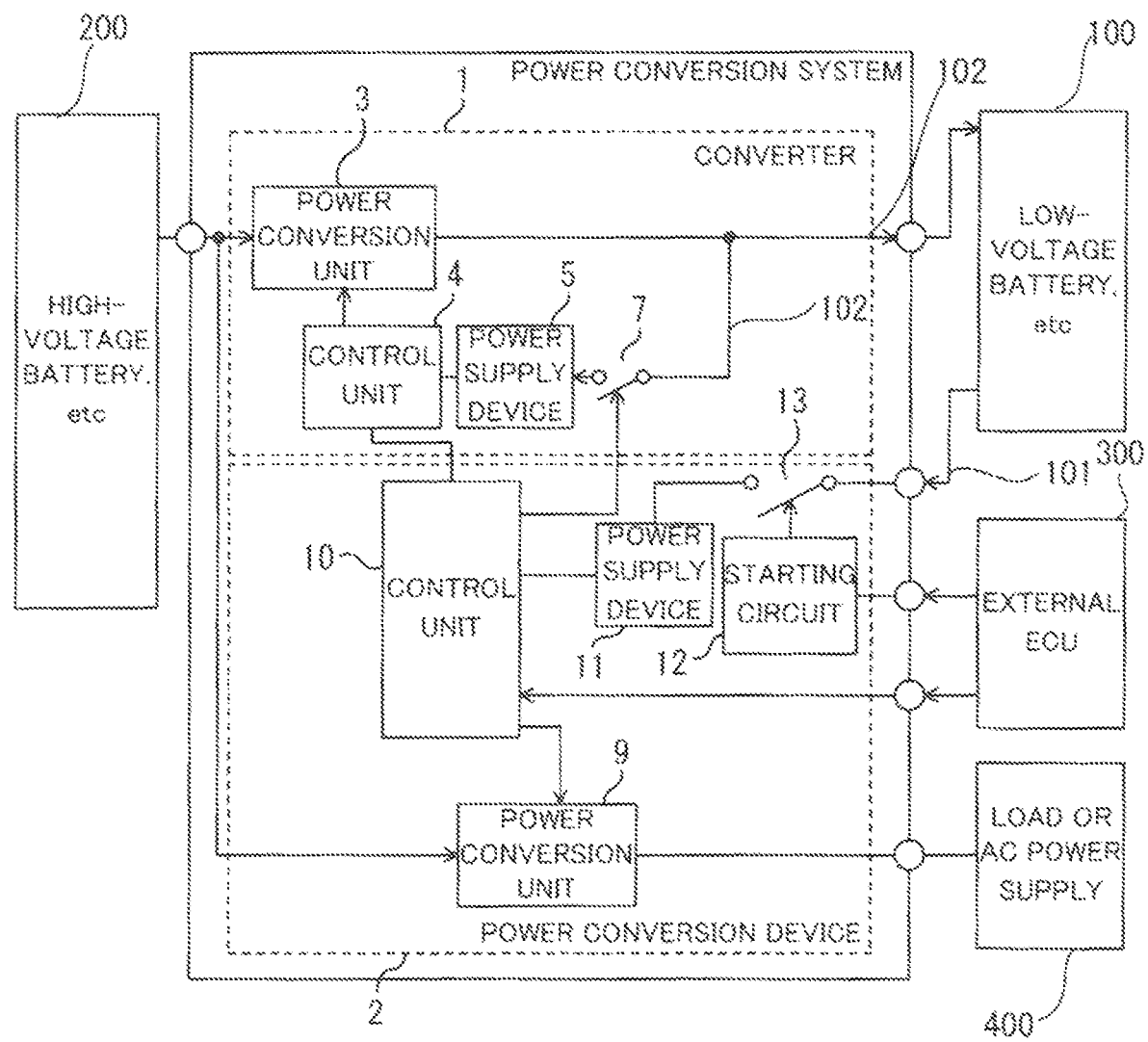
FIG. 2 is a block diagram showing the configuration of the power conversion system according to embodiment 1.

FIG. 2 is a block diagram showing the configuration of the power conversion system according to the present embodiment. In FIG. 2, the power conversion system is provided with the DC/DC converter 1 for charging the lead battery 100 (so-called low-voltage battery) of a 12 V type from a high-voltage battery 200 such as a lithium ion battery, and the other power conversion device 2 composed of a plurality of inverters or converters. The DC/DC converter 1 includes the control unit 4 for driving the DC/DC converter 1, and the power supply device 5 for supplying power to the control unit 4. An energy supply source for the power supply device 5 is an output of the DC/DC converter 1 itself or the low-voltage battery 100, and a switch 7 is provided in order to control the supply of power or the stop of the supply of power.

The DC/DC converter 1 and the other power conversion device 2 are stored in one housing, and individual components are independently controlled on the basis of communication information from a separate external ECU 300 mounted on the vehicle. The DC/DC converter 1 has a function of charging the low-voltage battery 100 from the high-voltage battery 200 such as a lithium ion battery, and is subjected to charging control on the basis of command information from the vehicle. The DC/DC converter 1 is formed by the power conversion unit 3 for performing power conversion of energy transferred from the high-voltage battery 200 to the low-voltage battery 100, the control unit 4 for controlling the power conversion unit 3, and the power supply device 5 for driving these units.

The power conversion unit 3 is a power conversion unit for performing power conversion from the high-voltage battery 200 to the low-voltage battery 100, and is composed of main circuit components including a semiconductor power device such as a metal-oxide-semiconductor field-effect transistor (MOSFET) or an insulated gate bipolar transistor (IGBT), a coil, a capacitor, a transformer, and the like.

For example, in a case of an insulation-type DC/DC converter, an H-bridge circuit composed of four MOSFET elements is driven, power is transmitted from the primary side to the secondary side of a transformer, thereafter a current is rectified through a diode, and the current flows through a coil and a capacitor.

The control unit 4 is a unit for driving the power conversion unit 3, and drives the main circuit so that a desired output is obtained in the power conversion unit 3, on the basis of various information such as values from a current sensor and a voltage sensor and command information from the external ECU 300. The control unit 4 regularly acquires physical observed values from the current sensor, the voltage sensor, and the like and sends them to the external ECU 300 by using controller area network (CAN) communication or the like. In addition, when abnormal operation or failure in the power conversion device is detected by using sensor information from the current sensor, the voltage sensor, and the like acquired by the control unit 4, the control unit 4 informs the external ECU 300 of the detection by using CAN communication or the like.

The power supply device 5 is a power supply circuit for supplying power to the control unit 4, and a power supply source for the power supply device 5 is an output of the DC/DC converter 1 or the low-voltage battery 100.

The switch (power supply function) 7 is controlled whether to supply power or to stop the supply of power, by a control unit (second control unit) 10 of the other power conversion device 2, during a standby state of the DC/DC converter 1. For the power supply device 5, a line of the low-voltage battery 100 is used as a supply source, and the switch 7 is controlled whether to supply power or to stop the supply of power, by the control unit 10 of the other power conversion device 2.

The other power conversion device 2 may be an inverter for driving a motor (corresponding to a load 400 in FIG. 1 to FIG. 4) for traveling of the vehicle. Alternatively, the other power conversion device 2 may be an inverter for driving a power generator for returning energy as regenerative energy to the high-voltage battery 200 when the vehicle decelerates, and the inverter may be connected to a motor for power generation (corresponding to the load 400 in FIG. 1 to FIG. 4) and convert AC power from the motor for power generation to DC power, in order to transfer regenerative energy induced in the motor for power generation when the vehicle decelerates, to the high-voltage battery 200.

Still alternatively, the other power conversion device 2 may be a charger for charging the high-voltage battery 200 from a system (corresponding to an AC power supply 400 in FIG. 1 to FIG. 4), i.e., the system is the AC power supply 400 shown in FIG. 1 to FIG. 4, and the other power conversion device 2 may charge the high-voltage battery 200, as a charger. Still alternatively, the other power conversion device 2 may be an inverter for a motor (corresponding to the load 400 in FIG. 1 to FIG. 4) of an air conditioner unit (electric A/C compressor) driven by the high-voltage battery 200.

For any purpose, the power conversion device 2 is basically composed of a power conversion unit 9, the control unit 10 for controlling the power conversion unit 9, and a power supply device 11 for driving the power conversion unit 9 and the control unit 10. The control unit 10 controls the switch 7 to be opened or closed on the basis of start information from the external ECU 300, so that power is supplied from the low-voltage battery 100 to the power supply device 5 of the DC/DC converter 1.

In addition, the control unit 10 is provided with a microprocessor (hereinafter, referred to as microcomputer), or a high-speed computation device such as a digital signal processor (DSP) or a dedicated control integrated circuit (IC), in order to perform motor control optimized on the basis of various information such as values from the current sensor and the voltage sensor and command information from the external ECU 300, in addition to an inverter, a power generator, and a boost converter.

Conventionally, control units in both power conversion devices 1 and 2 have microcomputers, and further, in the converter, a converter control IC specialized for power conversion control is adopted. These microcomputers have functions that are the same between both power conversion devices, e.g., functions as a communication interface with the external ECU 300 and as sensors for observing desired voltage, current, temperature, and the like. Therefore, if such functions are unified in the microcomputer of one of the power conversion devices, the other microcomputer can be omitted and thus the cost can be reduced. Therefore, for example, a high-function microcomputer is adopted for the control unit 10 of the power conversion device 2, and the control unit 4 is integrated as a converter control IC in the microcomputer, whereby their both functions can be implemented with an inexpensive configuration in total cost.

Specifically, among the above functions, failure detection or communication with the external ECU 300 is performed by the control unit 10.

Then, the control unit 4 and the power supply function 6 are controlled by, for example, a computation processing device (a microprocessor, a monitoring IC, etc.) in the control unit 10 of the other power conversion device 2, on the basis of information inside the power conversion device 2 and from the external ECU 300.

The power supply device 11 supplies power to the control unit 10, and is supplied with power via a harness 101 separate from an output system of the DC/DC converter 1. A power supply system for driving the control unit 4 and the power supply device 5 of the DC/DC converter 1, and a power supply system for driving the other power conversion device 2, are different from each other. That is, energy for the control unit 4 of the DC/DC converter 1 is acquired via an output cable 102, whereas energy to be supplied to the other power conversion device 2 is acquired via the separate harness 101. Thus, even when one of the power supply systems is disconnected, the other power conversion device is not influenced.

The output cable 102 is a conductive wire for supplying power from the DC/DC converter 1 to the low-voltage battery 100 (an arrow in FIG. 2 indicates this case). Meanwhile, in the present embodiment, power for driving the control unit 4 is also acquired from the low-voltage battery 100 by using the output cable 102. That is, at the time of start-up, power is acquired from the low-voltage battery 100, and during a normal operation, an output of the DC/DC converter 1 itself is used as a power supply source.

A switch 13 is provided between the power supply device 11 and the low-voltage battery 100. The switch 13 is opened or closed by a starting circuit 12 being driven in accordance with a signal from the external ECU 300, whereby energy is supplied to the power supply device 11.

As the switch 13, various types such as a mechanical relay and a semiconductor element can be used. On the other hand, as the switch 7, a semiconductor element is used. Thus, the durability can be improved as compared with a mechanical switch, whereby the durability of the corresponding function part of the product is improved and the mounting area can be reduced.

By the above configuration, the switch 7 is turned off during an operation stop state of the DC/DC converter 1, whereby standby power can be reduced.

Conventionally, a monitoring dedicated IC is used as described above. However, the control unit 10 of the other power conversion device 2 is used as a substitute for such a monitoring path, whereby components such as a monitoring dedicated IC can be omitted. Thus, the number of components can be reduced and the size of the product can be reduced.

In the other power supply path (harness 101), there are loss generation elements such as a relay, a fuse, and a reverse-connection preventing diode between the low-voltage battery 100 and the auxiliary power supply. Therefore, in a case of being shared with the other power supply path, supply of power through the power supply path cannot be stopped even when operation of the DC/DC converter 1 is stopped. Power supply efficiency is also better in the DC/DC converter 1 than in an individual auxiliary power supply. In view of the above, by providing the switch 7 as shown in FIG. 2, an optimum energy flow path can be formed including the individual auxiliary power supply configuration, whereby total loss in power components can be reduced.

In addition, since the power supply systems are separated as described above, even when the function of one power conversion device in the power conversion system has failed, the function of the other power conversion device is not influenced. Therefore, the operable power conversion device can continue its operation.

In addition, standby power of the components during an operation stop state can be reduced with a simple circuit configuration.

Conventionally, microcomputers have been provided in the DC/DC converter 1 and the power conversion device 2 separately from each other while being housed in the same housing, and therefore there has been a communication delay or a timing difference in coordinated operation between the DC/DC converter 1 and the power conversion device 2. However, by unifying microcomputers having the same function between both of the DC/DC converter 1 and the power conversion device 2, such a delay or timing difference can be eliminated.

By opening or closing the switch 7 of the DC/DC converter 1 by the power conversion device 2, supply of power can be stopped when an internal malfunction or failure has occurred in the DC/DC converter 1, and thus secondary failure can be prevented. Further, in the case in which the switch 7 of the DC/DC converter 1 is opened or closed by the power conversion device 2, response is better than in a case of switching the power output function on the basis of an external start signal, and it is possible to suppress wasteful power consumption corresponding to a case in which it is not necessary to charge the DC/DC converter 1. For example, when an input stop condition is satisfied, operation of directly opening the switch 7 by the power conversion device 2 can make a response time shorter than operation of opening the switch 7 via the external ECU 300 from the power conversion device 2.

Embodiment 2

Figure 3:
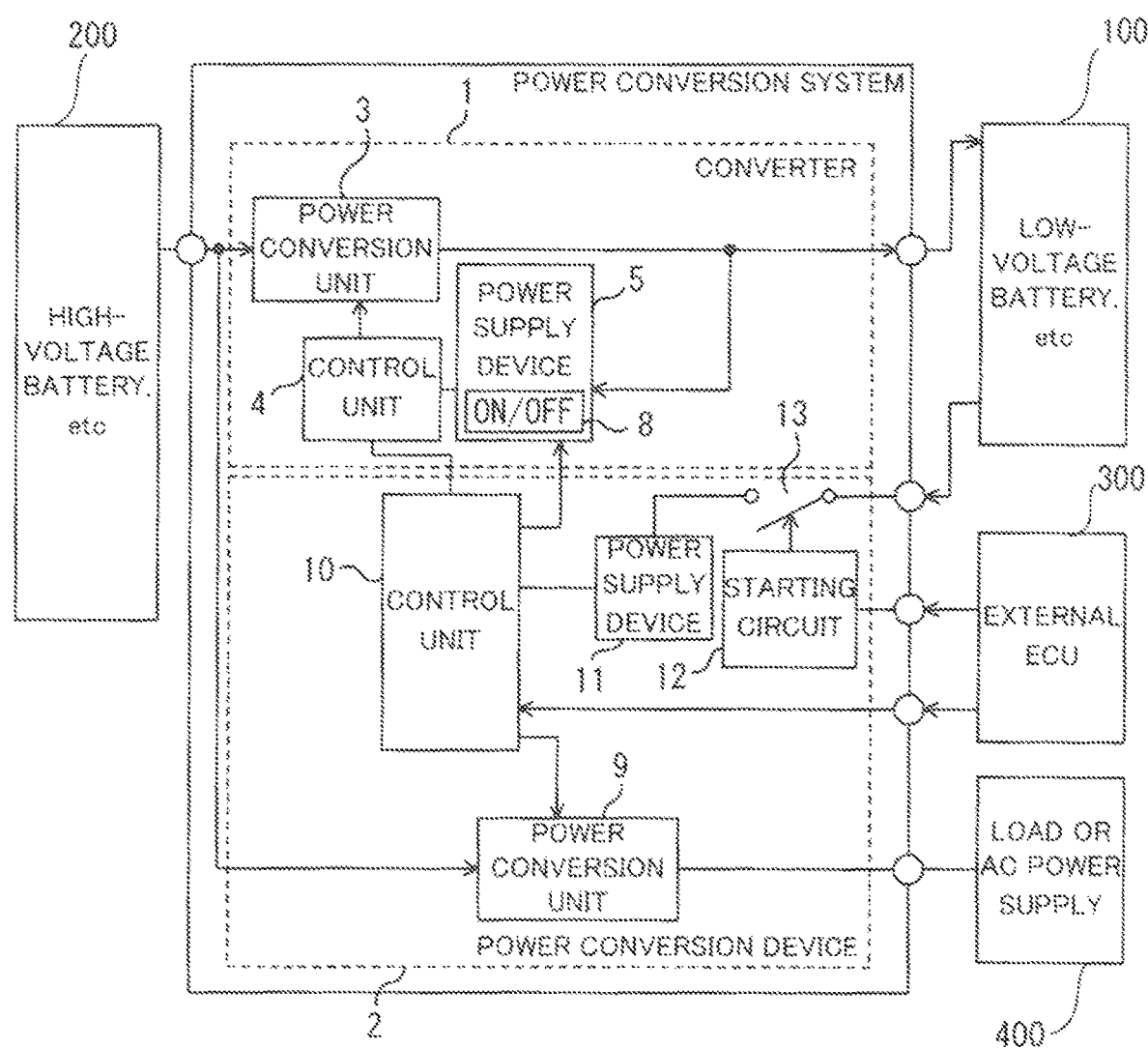
FIG. 3 is a block diagram showing the configuration of a power conversion system according to embodiment 2.

FIG. 3 is a block diagram showing the configuration of a power conversion system according to embodiment 2. As shown in FIG. 3, the power supply device 5 is provided with a power supply device output ON/OFF function 8 for issuing commands for output permission and output stoppage. The power supply device output ON/OFF function 8 is used as a substitute for the switch 7. The power supply device output ON/OFF function 8 is controlled by the control unit 10 in the same way as in embodiment 1.

Thus, the number of components can be reduced, whereby the power conversion system can be formed with a more inexpensive configuration, while the same effects as in embodiment 1 can be obtained.

Embodiment 3

Figure 4:
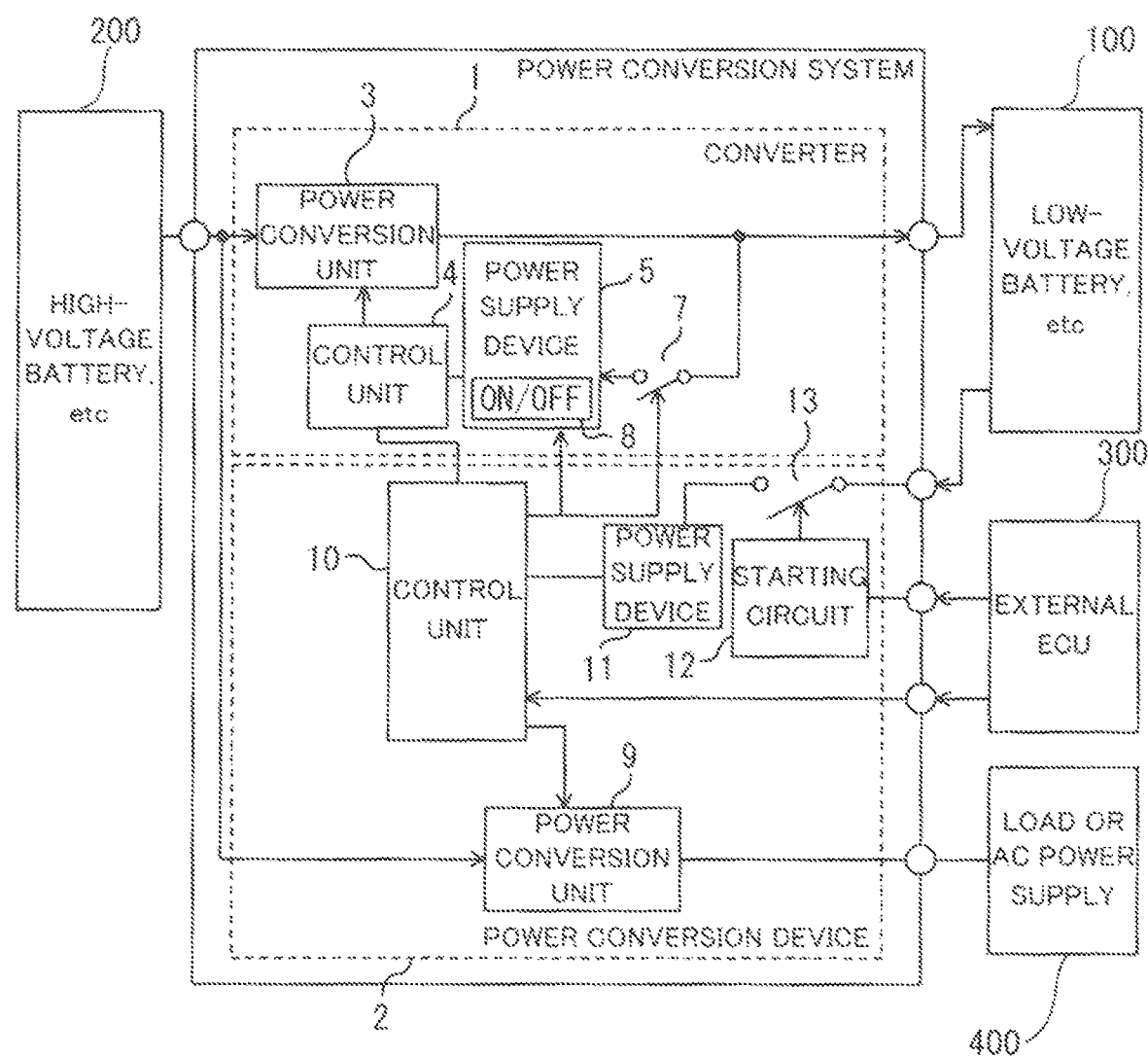
FIG. 4 is a block diagram showing the configuration of a power conversion system according to embodiment 3.

FIG. 4 is a block diagram showing the configuration of a power conversion system according to embodiment 3. As shown in FIG. 4, the power supply device 5 is provided with the power supply device output ON/OFF function 8 for issuing commands for output permission and output stoppage. The power supply device output ON/OFF function 8 and the switch 7 are used in combination. That is, the other power conversion device 2 drives both of the switch 7 and the power supply device output ON/OFF function 8 in order to start or stop the DC/DC converter 1.

In a case where the switch 7 is broken or in a case where the power supply device output ON/OFF function 8 has failed, standby power increases and thus the battery dead might occur. Considering this, the power supply device output ON/OFF function 8 and the switch 7 are used in combination so as to make a so-called redundant system for the switch function. Thus, even if one of the above two components has failed, the function of opening or closing the power supply line can be maintained by the other opening or closing function.

Besides, the numbers, the dimensions, the materials, and the like of the components described above may be changed appropriately.

Although the disclosure is described above in terms of various exemplary embodiments and implementations, it should be understood that the various features, aspects, and functionality described in one or more of the individual embodiments are not limited in their applicability to the particular embodiment with which they are described, but they can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 DC/DC converter
2 power conversion device
3 power conversion unit
4 first control unit
5 power supply device
6 power supply function
7 switch
8 power supply device output ON/OFF function
10 second control unit

The invention claimed is:
1. A power conversion system comprising:
a DC/DC converter for charging a battery; and a power conversion device composed of at least one of an inverter or a converter, wherein:

the DC/DC converter includes a power converting circuitry for converting input voltage to a required voltage, a first controlling circuitry for driving the power converting circuitry, a power supply device which supplies power to the first controlling circuitry and uses an output of the DC/DC converter or the battery as a power supply source, and a power supply function for controlling supply of power to the power supply device, the power supply function is controlled with respect to the power supply source, by a second controlling circuitry of the power conversion device, during a standby state of the DC/DC converter, and the second controlling circuitry controls the supply of power or the stop of the supply of power to reduce standby power in auxiliary circuitries comprising the power supply device and the first controlling circuitry of the DC/DC converter connected to the battery, wherein:

a first power supply system comprises a cable coupled to the battery, the first power supply system being for driving the first controlling circuitry and the power supply device of the DC/DC converter, the first power supply system being different from a second power supply system for driving the power conversion device, the second power supply system comprising a harness coupled to the battery, and the first power supply system is not affected when the harness is disconnected, and the second power supply system is not affected when the cable is disconnected.

2. The power conversion system according to claim 1, wherein the power supply function is formed by a switch.

3. The power conversion system according to claim 2, wherein a semiconductor element is used as the switch.

4. The power conversion system according to claim 3, wherein the power supply device is provided with a power supply device output ON/OFF function for issuing commands for output permission and output stoppage.

5. The power conversion system according to claim 4, wherein the first controlling circuitry and the power supply function are controlled by the second controlling circuitry on the basis of information inside the power conversion device and information from an external ECU.

6. The power conversion system according to claim 3, wherein a power supply system for driving the first controlling circuitry and the power supply device of the DC/DC converter, and a power supply system for driving the power conversion device, are different from each other.

7. The power conversion system according to claim 3, wherein the first controlling circuitry and the power supply function are controlled by the second controlling circuitry on the basis of information inside the power conversion device and information from an external ECU.

8. The power conversion system according to claim 2, wherein the power supply device is provided with a power supply device output ON/OFF function for issuing commands for output permission and output stoppage.

9. The power conversion system according to claim 8, wherein a power supply system for driving the first controlling circuitry and the power supply device of the DC/DC converter, and a power supply system for driving the power conversion device, are different from each other.

10. The power conversion system according to claim 8, wherein the first controlling circuitry and the power supply function are controlled by the second controlling circuitry on the basis of information inside the power conversion device and information from an external ECU.

11. The power conversion system according to claim 2, wherein the first controlling circuitry and the power supply function are controlled by the second controlling circuitry on the basis of information inside the power conversion device and information from an external ECU.

12. The power conversion system according to claim 1, wherein the power supply device is provided with a power supply device output ON/OFF function for issuing commands for output permission and output stoppage.

13. The power conversion system according to claim 12, wherein a power supply system for driving the first controlling circuitry and the power supply device of the DC/DC converter, and a power supply system for driving the power conversion device, are different from each other.

14. The power conversion system according to claim 12, wherein the first controlling circuitry and the power supply function are controlled by the second controlling circuitry on the basis of information inside the power conversion device and information from an external ECU.

15. The power conversion system according to claim 1, wherein the first controlling circuitry and the power supply function are controlled by the second controlling circuitry on the basis of information inside the power conversion device and information from an external ECU, the battery is a low voltage battery, the DC/DC converter is configured to charge the low voltage battery, and the power conversion device is configured to control a charging of a high voltage lithium ion battery.

16. The power conversion system according to claim 1, wherein the first controlling circuitry and the power supply function are controlled by the second controlling circuitry on the basis of information inside the power conversion device and information from an external ECU.

17. A power conversion system comprising:

a DC/DC converter for charging a battery; and a power conversion device composed of at least one of an inverter or a converter, wherein:

the DC/DC converter includes a power converting circuitry for converting input voltage to a required voltage, a first controlling circuitry for driving the power converting circuitry, and a power supply device which supplies power to the first controlling circuitry and uses an output of the DC/DC converter or the battery as a power supply source, the power supply device is provided with a power supply device output ON/OFF function for issuing commands for output permission and output stoppage, the power supply device output ON/OFF function is controlled with respect to supply of power, by a second controlling circuitry of the power conversion device, during a standby state of the DC/DC converter, and the second controlling circuitry controls the supply of power or the stop of the supply of power to reduce standby power in auxiliary circuitries comprising the power supply device and the first controlling circuitry of the DC/DC converter connected to the battery, wherein:

a first power supply system comprises a cable coupled to the battery, the first power supply system being for driving the first controlling circuitry and the power supply device of the DC/DC converter, the first power supply system being different from a second power supply system for driving the power conversion device, the second power supply system comprising a harness coupled to the battery, and the first power supply system is not affected when the harness is disconnected, and the second power supply system is not affected when the cable is disconnected.

* * * * *